Patented Aug. 11, 1931

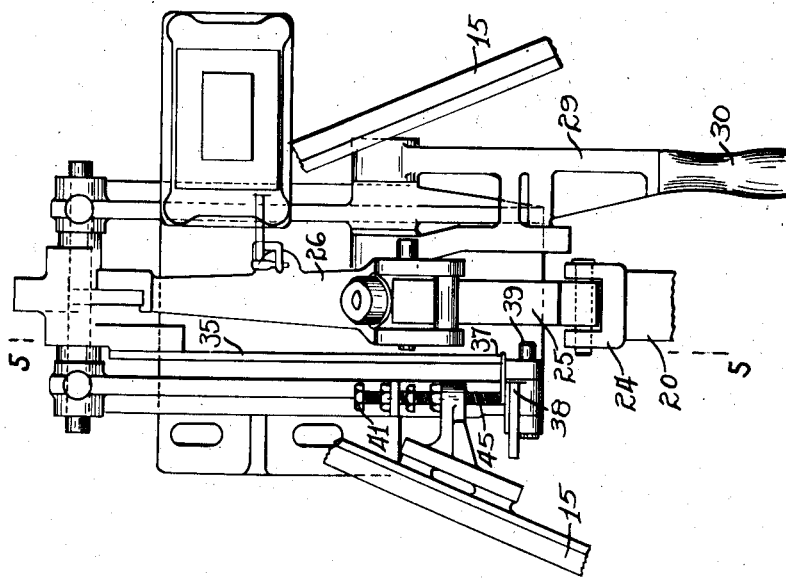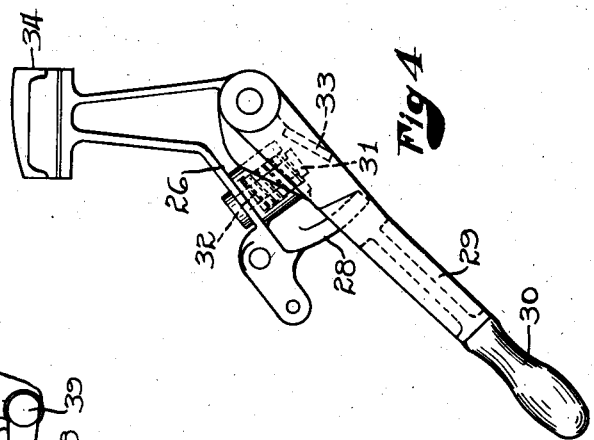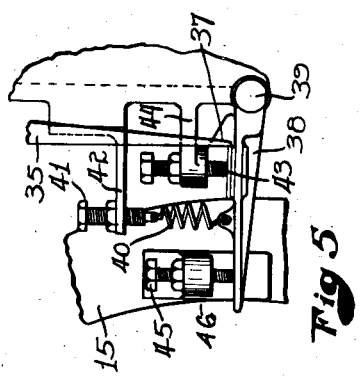

1,818,094

UNITED STATES PATENT OFFICE

WILLIAM R. PETERSON, OF CHICAGO, ILLINOIS, ASSIGNOR TO ST. REGIS PAPER COMPANY, OF NEW YORK, N. Y., A CORPORATION OF NEW YORK

SHUT-OFF DEVICE FOR BAG FILLING MACHINES

Application filed October 29, 1929. Serial No. 403,299.

This invention relates to a cut-off device for a bag filling machine, and more particularly to an automatic means for closing a cut-off gate in response to the weight of material in a bag.

An object of the invention is to provide cut-off means of the class described which will operate with minimum of friction affecting the action of the weighing device, and which may be adjusted to act promptly when the weighing device reacts to an exactly predetermined extent.

Other objects and details of the invention will appear as the description proceeds.

Figure 1:
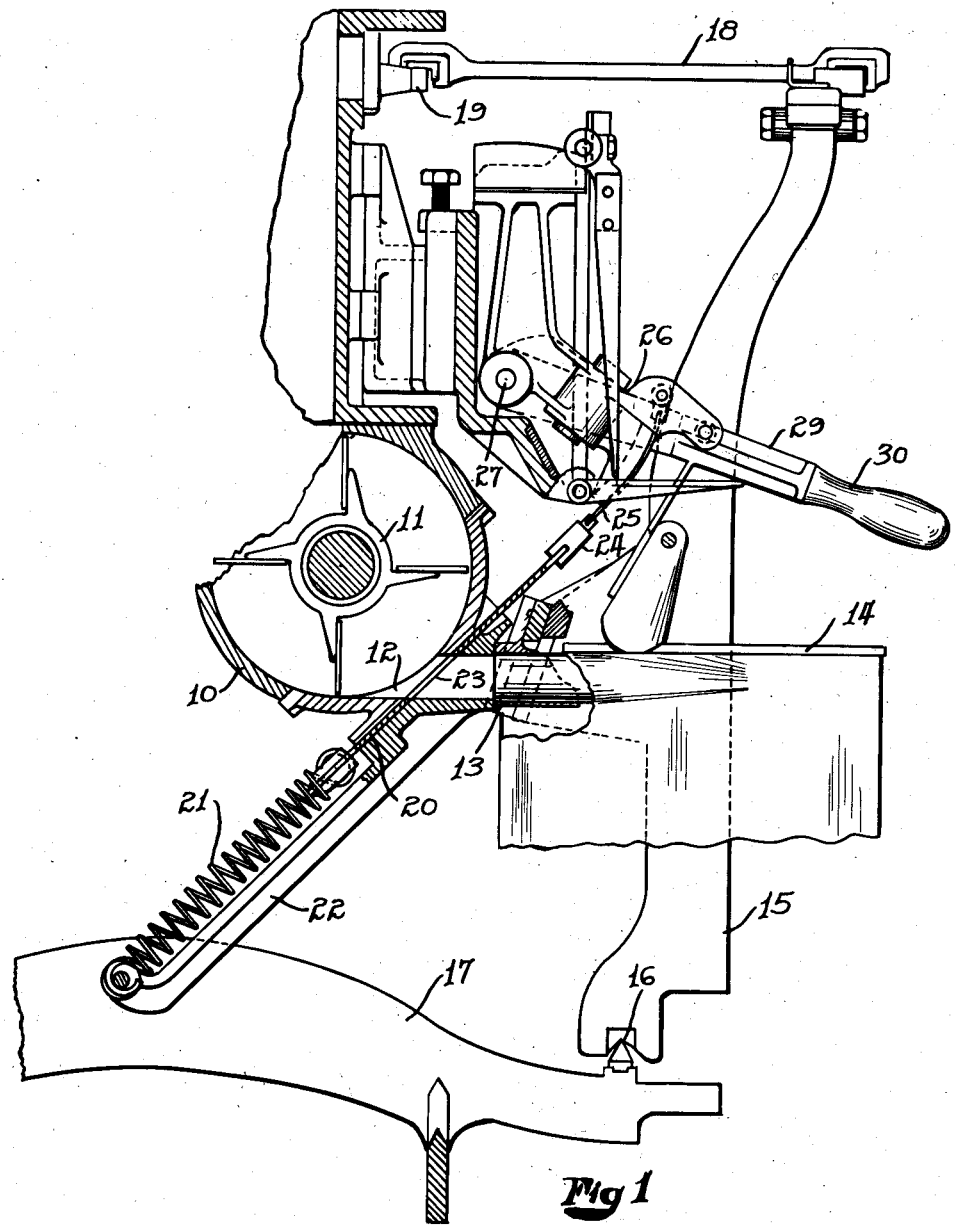
Figure 2:
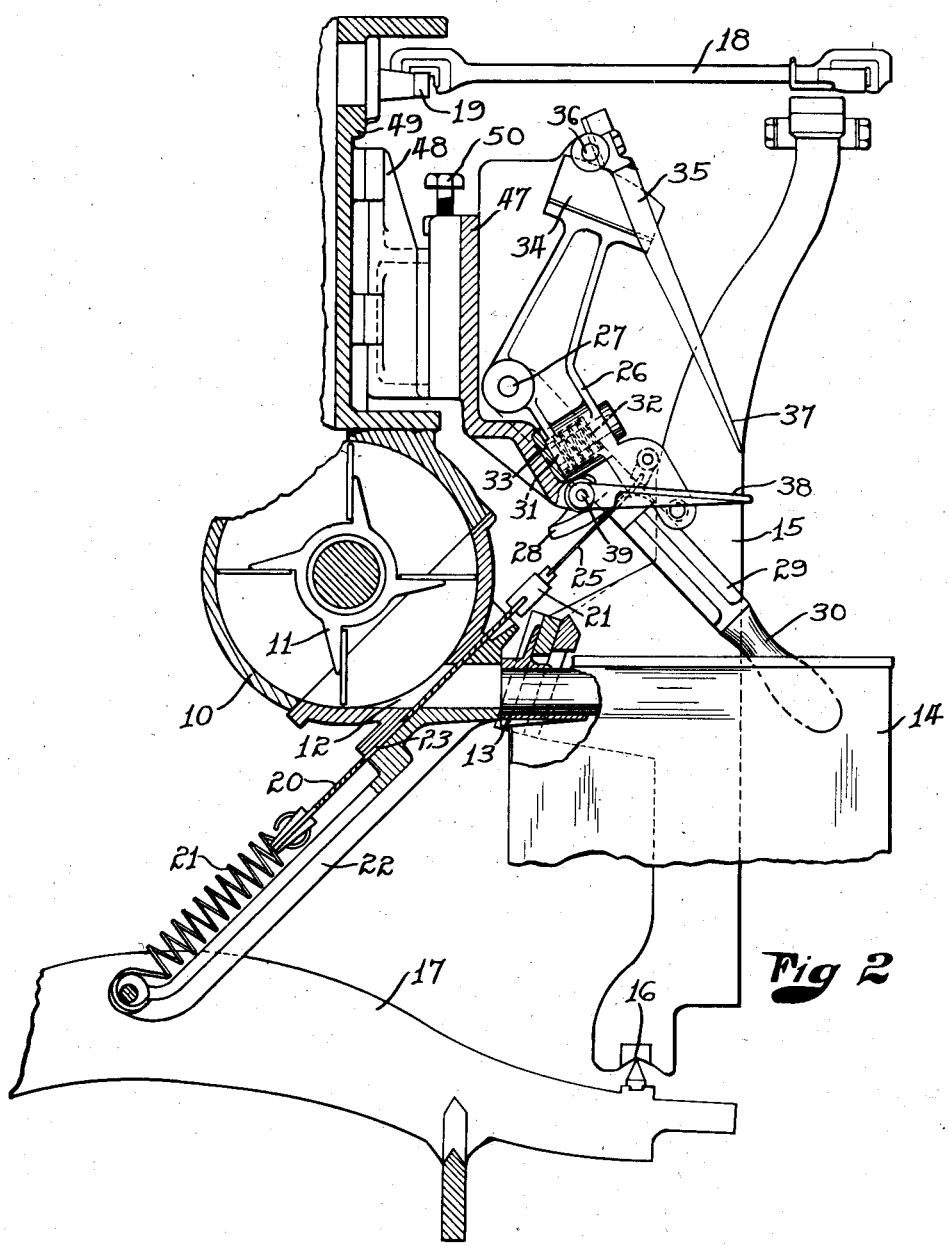

In the accompanying drawings forming a part of this specification, Fig. 1 is a vertical section of one embodiment of the invention, with so much of a filling and weighing machine as is necessary to show how the invention is used therewith; Fig. 2 is a section similar to Fig. 1, but showing the parts in a different position; Fig. 3 is a front elevation of a portion of the mechanism, as viewed from the right of Figs. 1 and 2; Fig. 4 is a detail of the gate-lifting lever; and Fig. 5 is a detail view substantially on the line 5—5 of Fig. 3, showing the construction of a portion of the trip mechanism.

The filling machine illustrated in connection with the cut-off comprises a casing 10 in which there is an impeller 11 adapted to drive material out through a discharge orifice 12. A spout 13, adapted to enter the filling valve of a bag 14, is mounted upon a frame 15 pivoted at 16 on a scale beam 17. When the bag is empty, the scale beam supports frame 15 in such a position that spout 13 registers with orifice 12, while the filled bag lowers the beam so that spout 13 is lowered out of correct alinement with orifice 12, as shown in Fig. 2. In the construction shown, a link 18 pivoted on the frame at 19 holds the upper end of the frame in position to bring the spout into free sliding contact with casing 10.

A gate 20 is provided for cutting off the flow of material through orifice 12. Gate 20 is constantly urged downward by a spring 21 connecting the gate to a bracket 22. The gate consists of a plate having therethrough an orifice 23 which may be brought into register with orifice 12 when the gate is lifted.

The upper end of the gate is provided with a connection 24 attached to a strap 25 suspended from an arm of a lever 26 fulcrumed at 27 on a stationary support. Lever 26 is provided with an arcuate lug 28 which contacts strap 25 and maintains the strap, where it is tangent to said arc, in line with gate 20.

An arm 29 is attached to lever 26 and is provided with a handle 30, by means of which the lever and gate may be lifted, against the tension of spring 21, to bring opening 23 in line with orifice 12.

A plunger 31 is mounted in lever 26, and is normally urged downward by a spring 32, and contacts a buffer plate 33 to cushion the fall of the lever and the jar at the end of the gate-closing movement of the parts.

The upper end 34 of lever 26 co-acts with a latch 35 pivoted at 36. The lower end 37 of the latch is normally caught by a trip 38 so as to hold it in position to keep lever 26 raised while a bag is being filled.

Trip 38 is pivoted at 39. A spring 40 is attached to a bolt 41 adjustable in a lug 42 and normally raises trip 38 against a set screw 43 in lug 44. A screw 45 is adjustable in a lug 46 on frame 15, in position to depress trip 38 when the frame is lowered.

Lever 26, latch 35 and trip 38, as well as lugs 42 and 44, are mounted on a bracket 47 which is slidable vertically on a bracket 48 attached to stationary frame 49. A set screw 50 holds bracket 47 at the desired height to properly register opening 23 with orifice 12 when the gate is raised, and to bring arcuate lug 28 in alignment with the gate.

The operation of the device may be understood from the foregoing description, but may be briefly outlined as follows. With the gate closed and the impeller in operation, a bag is placed on filling spout 13. Then handle 30 is raised, thereby raising lever 26, strap 25 and gate 20, until opening 23 registers with orifice 12. Thereafter material is driven from the casing by the impeller through the spout into the bag.

When lever 26 is oscillated in gate-opening direction, the point at which strap 25 is tangent to arc 28 remains in line with gate 20, so that there is no tendency to bend the gate and cause it to bind. When the gate is fully opened, end 34 is caught by latch 35, the end 37 of which is held by trip 38.

When the weight of material in the bag causes the scale beam to swing and lower frame 15, screw 45 depresses trip 38, releases latch 35, and allows spring 21 to draw down gate 20 until lever 26 is stopped by the contact of plunger 31 with plate 33, at which time opening 23 is entirely below orifice 12, so that no more material is delivered.

Screw 43 is adjusted so that trip 38 rises just far enough to catch end 37 of latch 35. Spring 40 is adjusted so as to overcome the weight of trip 38 and hold it in raised position until positively depressed, and screw 45 is adjusted so as to release latch 35 and allow the gate to close when frame 15 has been moved the exact amount that indicates the bag is filled as much as it should be when the gate is closed.

It will be readily seen that latch 35 is such length that it requires but little resistance at its end 37 to prevent the end 34 of lever 26 from swinging the latch about its pivot, since the lever contacts the latch so close to its pivot. For this reason there is little friction between the latch and trip, and therefore this friction does not materially affect the operation of the weighing device when the trip is being depressed. At the same time, the various means for adjustment allows the tripping mechanism to be set so as to close the gate at the correct instant.

While one embodiment of the invention has been described in some detail, it will be readily understood that changes may be made within the scope of the appended claims.

What is claimed is:

1. Apparatus for filling bags comprising a filling device having a discharge opening through which material is discharged into a bag, a gate for said opening, a spring constantly tending to close said gate, a bracket adjustable with respect to said opening, a lever fulcrumed on said bracket and connected to said gate, an arm on said lever, a latch fulcrumed on the bracket and adapted to engage said arm and hold the lever in gate-opening position, and means for releasing said latch when a bag is filled.

2. Apparatus for filling bags comprising a filling device having a discharge opening through which material is discharged into a bag, a gate for said opening, a spring constantly tending to close said gate, a bracket adjustable with respect to said opening, a lever fulcrumed on said bracket and connected to said gate, an arm on said lever, a latch fulcrumed on the bracket and adapted to engage said arm and hold the lever in gate-opening position, a trigger pivoted on said bracket, a supporting frame for the bag mounted upon a weighing device, and means on said frame for engaging the trigger to release the latch.

3. Apparatus for filling bags comprising a filling device having a discharge opening through which material is discharged into a bag, a gate for said opening, a spring constantly tending to close said gate, a bracket adjustable in a direction at an angle to the path of the gate, a lever fulcrumed on said bracket and connected to said gate, an arm on said lever, a latch fulcrumed on the bracket and adapted to engage said arm and hold the lever in gate-opening position, a trigger pivoted on said bracket, a supporting frame for the bag mounted upon a weighing device, and means on said frame for engaging the trigger to release the latch.

In testimony whereof I have hereunto signed my name to this specification.

WILLIAM R. PETERSON.